(12) United States Patent
Iwama et al.

(10) Patent No.: US 9,399,489 B2
(45) Date of Patent: Jul. 26, 2016

(54) VEHICLE-BODY FRONT STRUCTURE

(71) Applicant: TOYOTA JIDOSHA KABUSHIKI KAISHA, Toyota-shi, Aichi-ken (JP)

(72) Inventors: Toshiki Iwama, Toyota (JP); Hayato Kaneko, Nagakute (JP); Hiroshi Mizuo, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/325,770

(22) Filed: Jul. 8, 2014

(65) Prior Publication Data

US 2015/0014084 A1 Jan. 15, 2015

(30) Foreign Application Priority Data

Jul. 9, 2013 (JP) .................................. 2013-143685

(51) Int. Cl.
| | |
|---|---|
| *B62D 25/08* | (2006.01) |
| *B60R 19/26* | (2006.01) |
| *B62D 21/15* | (2006.01) |
| *B60R 19/34* | (2006.01) |

(52) U.S. Cl.
CPC .............. *B62D 25/082* (2013.01); *B60R 19/26* (2013.01); *B60R 19/34* (2013.01); *B62D 21/152* (2013.01)

(58) Field of Classification Search
CPC .... B62D 25/08; B62D 25/082; B62D 21/152; B60R 19/34; B60R 19/26
See application file for complete search history.

(56) References Cited

U.S. PATENT DOCUMENTS

| | | | | |
|---|---|---|---|---|
| 5,466,033 A | * | 11/1995 | Murakami et al. | 296/203.02 |
| 8,118,349 B2 | * | 2/2012 | Kihara et al. | 296/187.09 |
| 8,596,711 B2 | * | 12/2013 | Yasui et al. | 296/187.09 |
| 8,789,877 B2 | * | 7/2014 | Ohnaka et al. | 296/193.09 |
| 8,794,696 B2 | * | 8/2014 | Iseki et al. | 296/204 |
| 2003/0090129 A1 | * | 5/2003 | Riley et al. | 296/203.03 |
| 2009/0243336 A1 | * | 10/2009 | Honji et al. | 296/187.09 |
| 2011/0095568 A1 | | 4/2011 | Terada et al. | |
| 2012/0086225 A1 | | 4/2012 | Matsuura et al. | |
| 2013/0069393 A1 | * | 3/2013 | Kihara et al. | 296/203.02 |
| 2013/0249248 A1 | * | 9/2013 | Ohnaka | B62D 21/152 296/203.02 |
| 2013/0320710 A1 | * | 12/2013 | Watanabe | B62D 25/082 296/187.09 |

FOREIGN PATENT DOCUMENTS

| | | |
|---|---|---|
| JP | 5213123 A | 8/1993 |
| JP | 200887675 A | 4/2008 |
| JP | 2012-081844 A | 4/2012 |
| JP | 2012166743 A | 9/2012 |

* cited by examiner

*Primary Examiner* — Paul N Dickson
*Assistant Examiner* — Timothy Wilhelm
(74) *Attorney, Agent, or Firm* — Sughrue Mion, PLLC (57) ABSTRACT

A vehicle-body front structure includes: a front side member which has a closed section by joining an inner panel placed on a vehicle-width inner side to an outer panel placed on a vehicle-width outer side, the front side member being placed in a vehicle-body front portion along a vehicle-body front-rear direction and being provided with an energy absorption portion that is provided on a vehicle-body front side of the front side member; and a reinforcing member provided on an inner-panel side in an offset manner toward the vehicle-width inner side from a vehicle-width outer end of a rear end of the energy absorption portion in a plane view.

7 Claims, 7 Drawing Sheets

VEHICLE-BODY FRONT STRUCTURE

The disclosure of Japanese Patent Application No. 2013-143685 filed on Jul. 9, 2013 including the specification, drawings and abstract is incorporated herein by reference in its entirety.

BACKGROUND OF THE INVENTION

1. Field of the Invention

The present invention relates to a vehicle-body front structure.

2. Description of Related Art

There has been known a vehicle-body front structure configured such that an inner side surface of a crash box is formed diagonally toward a vehicle-width outer side as it goes toward a vehicle-body front side in a plane view, so that a bending moment caused in the crash box at the time of an offset collision is decreased (for example, see Japanese Patent Application Publication No. 2012-81844 (JP 2012-81844 A)).

However, the vehicle-body front structure described in JP 2012-81844 A does not take into consideration a load transmission structure configured to generate a force (lateral force) directed toward an opposite side to a collision side in a vehicle width direction at the time of a short overlap collision. Thus, there is room for improvement in the load transmission structure configured to efficiently generate a lateral force with respect to a vehicle.

SUMMARY OF THE INVENTION

In view of this, the present invention provides a vehicle-body front structure that is able to efficiently generate a lateral force with respect to a vehicle at the time of a short overlap collision.

A vehicle-body front structure according to one aspect of the present invention includes: a front side member which has a closed section by joining an inner panel placed on a vehicle-width inner side to an outer panel placed on a vehicle-width outer side, the front side member being placed in a vehicle-body front portion along a vehicle-body front-rear direction and being provided with an energy absorption portion that is provided on a vehicle-body front side of the front side member; and a reinforcing member provided on an inner-panel side in an offset manner toward the vehicle-width inner side from a vehicle-width outer end of a rear end of the energy absorption portion in a plane view.

According to one aspect of the present invention, the reinforcing member is provided on the inner-panel side of the front side member in an offset manner toward the vehicle-width inner side from the vehicle-width outer end of the rear end of the energy absorption portion in a plane view. Accordingly, at the time when a vehicle has a short overlap collision with a barrier, if an outer-panel side is deformed in a compressive manner while a collision load is received by the energy absorption portion, the inner-panel side provided with the reinforcing member is hard to be deformed, and the reinforcing member intervenes between the barrier and the power unit.

Hereby, a collision load input into the front side member is efficiently transmitted to a power unit via the reinforcing member, so that a lateral force is efficiently generated with respect to the vehicle. Note that the energy absorption portion according to the one aspect of the invention may be formed separately from a vehicle-body front side of the front side member so as to be attached thereto, or may be formed as part of the vehicle-body front side of the front side member.

As described above, according to the one embodiment of the present invention, it is possible to efficiently generate a lateral force with respect to the vehicle at the time of a short overlap collision.

Further, the vehicle-body front structure may be configured such that: a rear end of the reinforcing member is placed on the vehicle-body front side relative to a support portion provided in the front side member which supports a power unit placed on the vehicle-width inner side of the front side member, and is also placed on a vehicle-body rear side relative to a vehicle-body front-side end of the power unit in a plane view.

According to the vehicle-body front structure, the rear end of the reinforcing member is placed on the vehicle-body front side relative to the support portion provided in the front side member which supports the power unit placed on the vehicle-width inner side of the front side member, and is also placed on the vehicle-body rear side relative to the vehicle-body front-side end of the power unit in a plane view. Accordingly, at the time of a short overlap collision, the reinforcing member easily intervenes between the barrier and the power unit. Hereby, a collision load input into the front side member is efficiently transmitted to the power unit via the reinforcing member at an early stage.

According to the vehicle-body front structure, it is possible to transmit the collision load input into the front side member, to the power unit early and efficiently at the time of the short overlap collision.

Further, the vehicle-body front structure may be configured such that: a part of the front side member which is placed on the vehicle-body front side relative to the rear end of the reinforcing member has a strength higher than a part of the front side member which is placed on the vehicle-body rear side relative to the rear end of the reinforcing member.

According to the vehicle-body front structure, the part of the front side member which is placed on the vehicle-body front side relative to the rear end of the reinforcing member has a strength higher than the part of the front side member which is placed on the vehicle-body rear side relative to the rear end of the reinforcing member. Accordingly, at the time of a short overlap collision, the part of the front side member which is placed on the vehicle-body rear side relative to the rear end of the reinforcing member is easily deformed to be bent inwardly in the vehicle width direction, so that the reinforcing member easily intervenes between the barrier and the power unit. Hereby, a collision load input into the front side member is efficiently transmitted to the power unit via the reinforcing member at an early stage.

According to the vehicle-body front structure, at the time of a short overlap collision, the front side member is easily deformable to be bent inwardly in the vehicle width direction, Further, the vehicle-body front structure may be configured such that a length of the front side member in a vehicle width direction is increased in a plane view as the front side member goes toward the vehicle-body front side from the rear end of the reinforcing member.

According to the vehicle-body front structure, the length of the front side member in the vehicle width direction is increased in a plane view as the front side member goes toward the vehicle-body front side from the rear end of the reinforcing member. Accordingly, at the time of a short overlap collision, a moment of a force to cause the part of the front side member which is placed on the vehicle-body rear side relative to the rear end of the reinforcing member to be deformed to be bent inwardly in the vehicle width direction is easily generated, so that the reinforcing member easily intervenes between the barrier and the power unit. Hereby, a collision load input into the front side member is efficiently transmitted to the power unit via the reinforcing member at an early stage.

According to the vehicle-body front structure, it is possible to easily generate a moment of a force to cause the front side member to be deformed to be bent inwardly in the vehicle width direction at the time of a short overlap collision.

Further, the vehicle-body front structure may be configured such that: a vehicle-width outer end of a rear end of the energy absorption portion is placed at the same position as a vehicle-width outer end of a front end of the outer panel in a plane view.

According to the vehicle-body front structure, the vehicle-width outer end of the rear end of the energy absorption portion is placed at the same position as the vehicle-width outer end of the front end of the outer panel in a plane view. Accordingly, at the time of a short overlap collision, a collision load is efficiently transmitted from the energy absorption portion to the outer panel, so that a moment of a force to cause the part of the front side member which is placed on the vehicle-body rear side relative to the rear end of the reinforcing member to be deformed to be bent inwardly in the vehicle width direction is further easily generated.

According to the vehicle-body front structure, it is possible to further easily generate a moment of a force to cause the front side member to be deformed to be bent inwardly in the vehicle width direction at the time of a short overlap collision.

Further, the vehicle-body front structure may be configured such that a rear end of the energy absorption portion is placed at the same position as a front end of the reinforcing member in a plane view.

According to the vehicle-body front structure, the rear end of the energy absorption portion is placed at the same position as the front end of the reinforcing member in a plane view. This accordingly makes it possible to restrain or prevent a disturbance of a compressive deformation of the energy absorption portion by the reinforcing member.

According to the vehicle-body front structure, it is possible to restrain or prevent a disturbance of a compressive deformation of the energy absorption portion by the reinforcing member.

Further, the vehicle-body front structure may be configured such that the inner panel is formed to have a "U" shaped section, and the reinforcing member is placed along an inner surface of the inner panel.

According to the vehicle-body front structure, the inner panel is formed to have a "U" shaped section, and the reinforcing member is placed along the inner surface of the inner panel. Accordingly, the inner panel is reinforced appropriately in comparison with a configuration in which the reinforcing member is not placed along the inner surface of the inner panel.

According to the vehicle-body front structure, it is possible to reinforce the inner panel appropriately.

The vehicle-body front structure may be configured such that the reinforcing member is formed with the vehicle-body front-rear direction being taken as a longitudinal direction, and has a rectangular casing shape having an opening on its vehicle-width outer side.

The reinforcing member may include a side wall having an outer surface joined to an inner surface of an inner wall of the inner panel; and a recessed groove serving as a bead portion may be formed in a central part of the side wall in a vehicle-body up-down direction so that the recessed groove is recessed outwardly in the vehicle width direction in a rectangular shape and extends in the vehicle-body front-rear direction.

According to the vehicle-body front structure, edge line portions constituting the recessed groove (and extending in the vehicle-body front-rear direction) improve a rigidity (strength) of the side wall (the reinforcing member) at least in the vehicle-body front-rear direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the present invention will be described below in detail with reference to drawings. Note that, for the convenience of the description, in each of the drawings, an arrow UP indicates a vehicle-body upward direction, an arrow FR indicates a vehicle-body forward direction, and an arrow LE indicates a vehicle-body left direction. Further, in the following description, in a case where an up-down direction, a front-rear direction, and a right-left direction are described without any special description, they respectively indicate up and down of a vehicle-body up-down direction, front and rear of a vehicle-body front-rear direction, and right and left of a vehicle-body right-left direction (a vehicle width direction).

Further, a left side of a vehicle body is illustrated in FIGS. 1, 4 to 7. In terms of this, a right side of the vehicle body is the same as the left side because the vehicle body is configured in a symmetrical manner, so that a description on the right side of the vehicle body is omitted appropriately. Further, in the following description, that a length of a front side member 12 in the vehicle width direction is increased (expanded) may be expressed as "widening."

Figure 1:
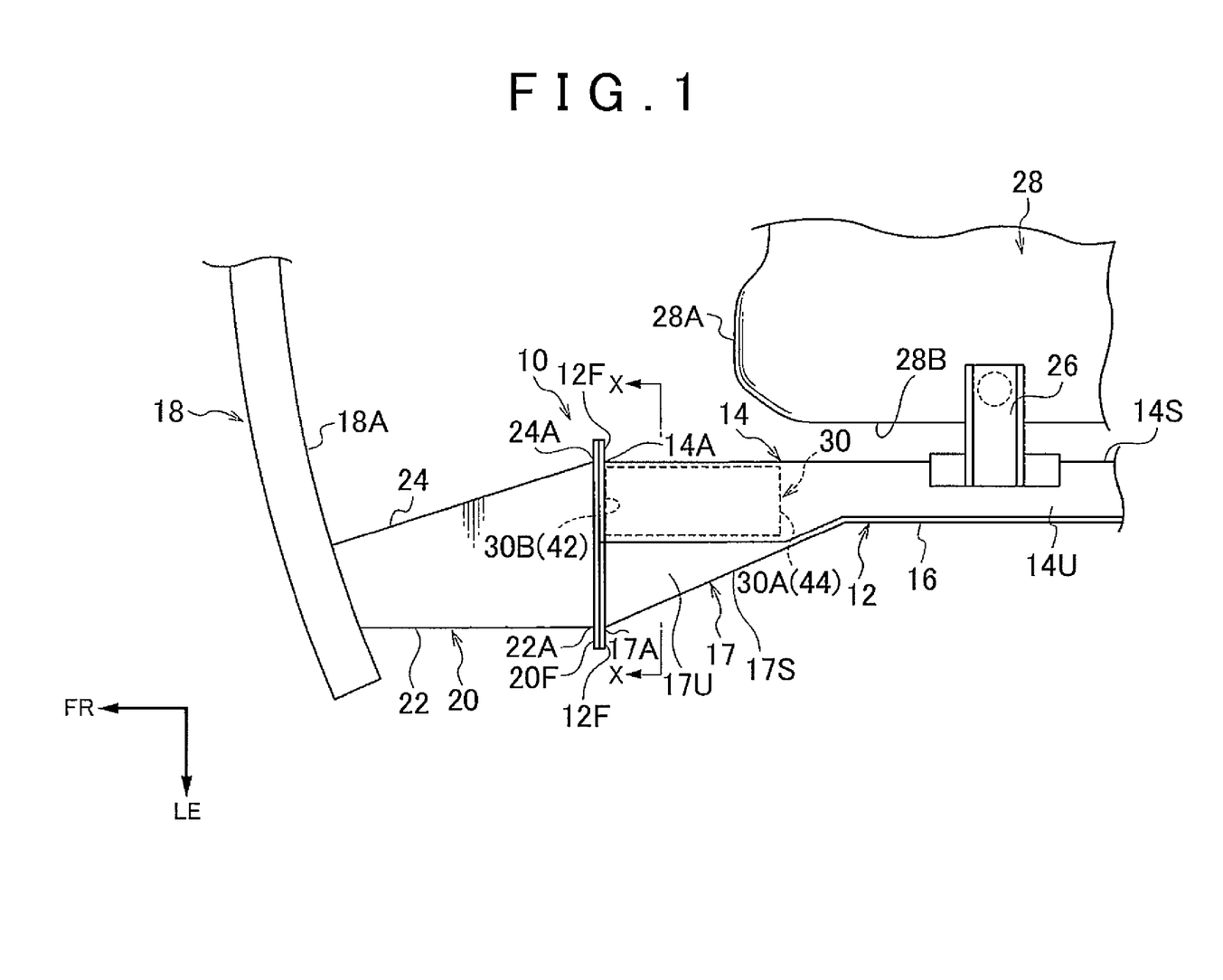
FIG. 1 is a plane view illustrating a schematic configuration of a vehicle-body front structure according to a first embodiment.

<First Embodiment> The following describes a vehicle-body front structure 10 according to a first embodiment. As illustrated in FIG. 1, in a vehicle-body front portion of a vehicle, paired right and left front side members 12 extending in the vehicle-body front-rear direction is disposed. Each of the front side members 12 includes: an inner panel 14 having a "U" shaped section (see FIG. 2); and an outer panel 16 having a "U" shaped section.

That part (hereinafter referred to as "outer panel 17") of the outer panel 16 which is placed on a vehicle-body front side relative to a vicinal area of a rear end 30A of the after-mentioned reinforcing member 30 is formed in a shape that is widened toward a vehicle-width outer side as it goes toward the vehicle-body front side in a plane view. That is, the outer panel 17 is formed in a shape of a right-angled triangle in which an inner end thereof on the vehicle-body front side has a right angle in a plane view, and an outer wall 17S on the vehicle-width outer side is an inclined wall that is inclined outwardly toward the vehicle-body front side.

Figure 2:
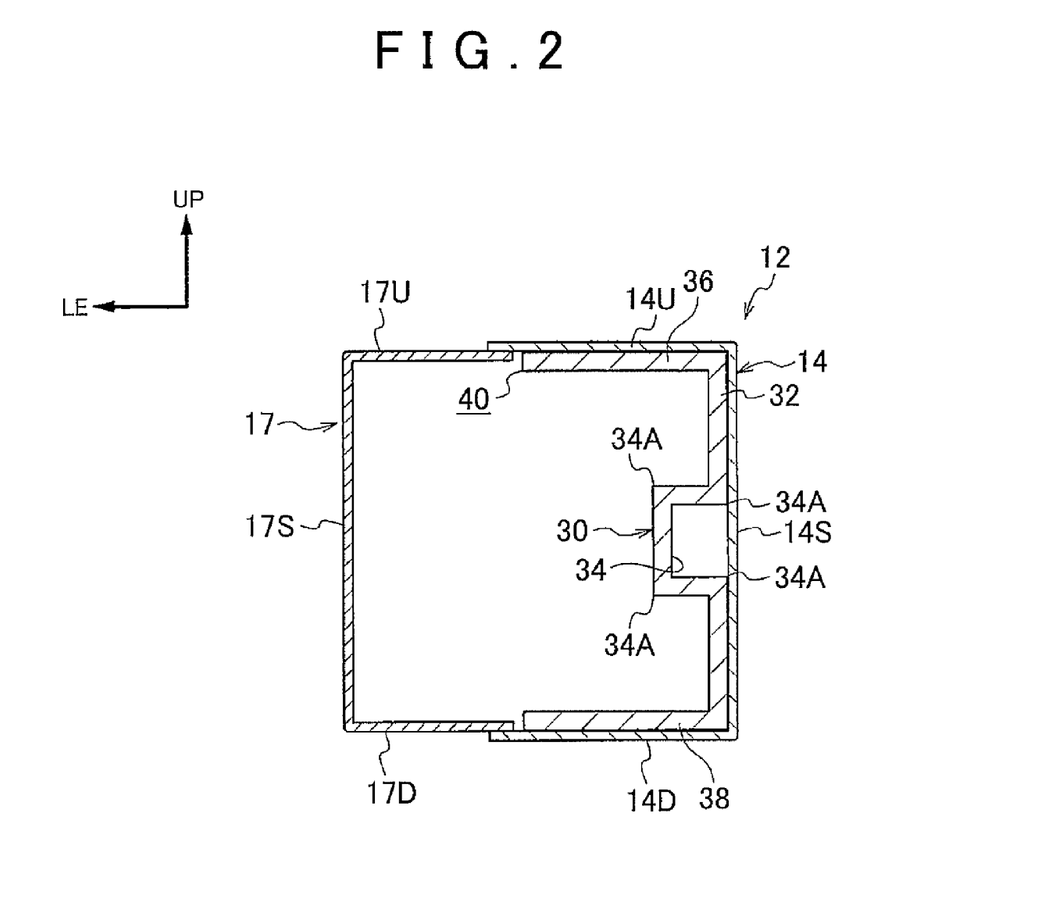
FIG. 2 is a sectional view taken along an arrow X-X in FIG. 1 and illustrates a front side member constituting the vehicle-body front structure according to the first embodiment.

Each of the front side members 12 is configured to have a rectangular closed section such that vehicle-width outer ends of an upper wall 14U and a bottom wall 14D of the inner panel 14 are superimposed, from above and underneath, on respective vehicle-width inner ends of an upper wall and a bottom wall of the outer panel 16 and respective vehicle-width inner ends of an upper wall 17U and a bottom wall 17D of the outer panel 17, so as to be joined (welded) to each other (see FIG. 2).

That is, each of the front side members 12 is configured to have a rectangular closed section such that open ends of the inner panel 14 are superimposed on open ends of the outer panels 16, 17 so as to be joined (welded) thereto, so that a front side of the each of the front side members 12 is widened toward the vehicle-width outer side as it goes toward the vehicle-body front side.

Further, a crash box 20 configured to have a rectangular closed section and to serve as an energy absorption portion is provided on the vehicle-body front side of each of the front side members 12. More specifically, a flange portion 12F projecting in a direction perpendicular to an axial direction (the vehicle-body front-rear direction) of each of the front side members 12 is formed integrally with a front end of the each of the front side members 12 (the inner panel 14 and the outer panel 17), and a flange portion 20F projecting in a direction perpendicular to an axial direction (the vehicle-body front-rear direction) of each of the crash boxes 20 is formed integrally with a rear end of the each of the crash boxes 20.

Accordingly, when the flange portion 12F of the each of the front side members 12 is put on the flange portion 20F of the each of the crash boxes 20 so as to be joined thereto, the each of the crash boxes 20 is attached to the vehicle-body front side of the each of the front side members 12, coaxially to the each of front side members 12.

Note that, in a plane view, a vehicle-width outer end of the rear end of the crash box 20 (except for the flange portion 20F) is placed at the same position as a vehicle-width outer end of a front end of the outer panel 17 (except for the flange portion 12F). Further, a vehicle-width inner end of the rear end of the crash box 20 (except for the flange portion 20F) is placed at the same position as a vehicle-width inner end of a front end of the inner panel 14 (except for the flange portion 12F).

That is, a rear end 22A of an outer wall 22 on a vehicle-width outer side of the crash box 20 abuts with a front end 17A of an outer wall 17S on a vehicle-width outer side of the outer panel 17, and a rear end 24A of an inner wall 24 on a vehicle-width inner side of the crash box 20 abuts with a front end 14A of an inner wall 14S on a vehicle-width inner side of the inner panel 14.

Further, each of the crash boxes 20 is formed in a tapered shape in which a length thereof in the vehicle width direction is reduced as it goes toward the vehicle-body front side in a plane view. That is, in a plane view, the outer wall 22 of the crash box 20 is a straight wall (parallel to the inner wall 14S of the inner panel 14) along the vehicle-body front-rear direction, and the inner wall 24 of the crash box 20 is an inclined wall inclined outwardly in the vehicle width direction as it goes toward the vehicle-body front side.

Further, a front bumper reinforcement 18 having a rectangular closed section and extending generally in the vehicle width direction is provided over respective front ends of the crash boxes 20. That is, the respective front ends of the crash boxes 20 are joined to a rear wall 18A of the front bumper reinforcement 18.

Further, a power unit 28 including at least an engine and a transmission is disposed between the right and left front side members 12 (vehicle-width inner sides of the right and left front side members 12). More specifically, an engine mount 26 serving as a support portion is provided in each of the front side members 12 (the upper wall 14U of the inner panel 14); so that the power unit 28 is supported by the front side members 12 via the respective engine mounts 26.

Figure 3:
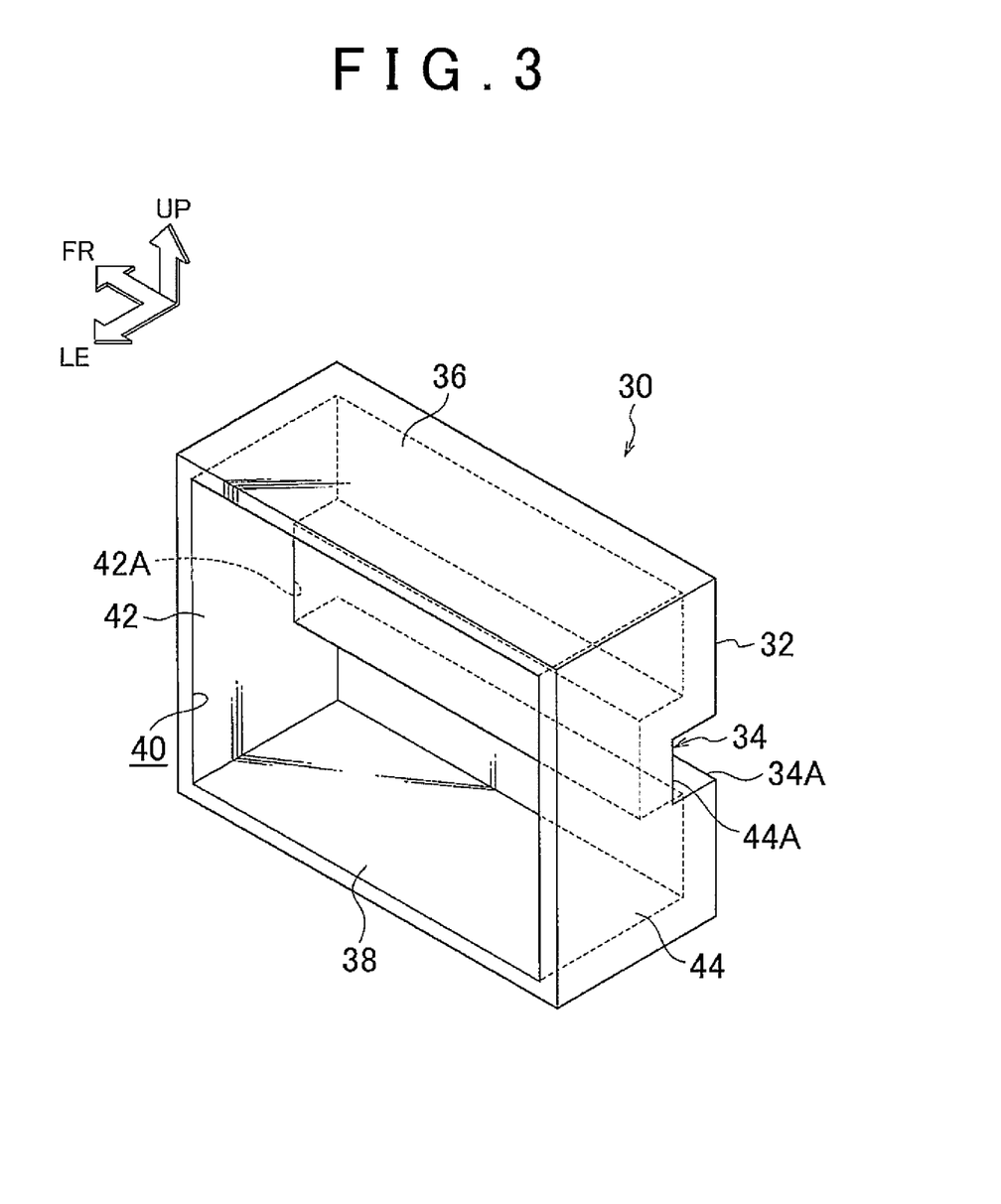
FIG. 3 is a perspective view illustrating a reinforcing member constituting the vehicle-body front structure according to the first embodiment.

Further, as illustrated in FIGS. 1, 2, a reinforcing member 30 made from metal (for example, iron) is provided in a front side of the front side member 12, more specifically, on an inner surface side of the inner panel 14 (the inner wall 14S) opposed to the outer panel 17 in the vehicle width direction. As illustrated in FIG. 3, the reinforcing member 30 is formed in a generally rectangular casing shape in which an opening 40 is formed on a vehicle-width outer side thereof with the vehicle-body front-rear direction being taken as its longitudinal direction. A plate thickness of the reinforcing member 30 is set to be several times (e.g., two to four times) as large as plate thicknesses of the inner panel 14 and the outer panel 16.

The reinforcing member 30 includes a side wall 32 of which an outer surface is joined to an inner surface of the inner wall 14S of the inner panel 14, and a recessed groove 34 serving as a bead portion recessed outwardly in the vehicle width direction in a rectangular shape and extending in the vehicle-body front-rear direction is formed generally in a central part of the side wall 32 in the vehicle-body up-down direction. Edge line portions 34A constituting the recessed groove 34 (and extending in the vehicle-body front-rear direction) improve a rigidity (strength) of the side wall 32 (the reinforcing member 30) at least in the vehicle-body front-rear direction.

Further, the reinforcing member 30 includes an upper wall 36 of which an outer surface is joined to an inner surface of the upper wall 14U of the inner panel 14, and a bottom wall 38 of which an outer surface is joined to an inner surface of the bottom wall 14D of the inner panel 14. The reinforcing member 30 includes a front wall 42 closing a vehicle-body front side thereof, and a rear wall 44 closing a vehicle-body rear side thereof. Notch portions 42A, 44A continued to the recessed groove 34 are formed on respective vehicle-width inner sides of the front wall 42 and the rear wall 44 so as to be placed generally in central parts thereof in the vehicle-body up-down direction.

When the reinforcing member 30 configured as such is placed along respective inner surfaces of the inner wall 14S, the upper wall 14U, and the bottom wall 14D of the inner panel 14 (the side wall 32 is joined to the inner wall 14S, the upper wall 36 is joined to the upper wall 14U, and the bottom wall 38 is joined to the bottom wall 14D), the rigidity (strength) of the inner panel 14 becomes higher than rigidities (strengths) of the outer panels 16, 17 (the inner panel 14 is strengthened appropriately so that the inner panel 14 is hard to be crushed).

Note that, as illustrated in FIG. 1, the reinforcing member 30 is placed so that its front end 30B (the front wall 42) is distanced inwardly in the vehicle width direction from the front end 17A of the outer wall 17S of the outer panel 17 (the rear end 22A of the outer wall 22 of the crash box 20), in a plane view. In other words, the reinforcing member 30 is placed in an offset manner toward the vehicle-width inner side so that a gap is formed between the reinforcing member 30 and the outer wall 17S of the outer panel 17.

Further, as illustrated in FIG. 1, the reinforcing member 30 is placed so that the rear end 30A (the rear wall 44) is placed on the vehicle-body front side relative to the engine mount 26 and on the vehicle-body rear side relative to a vehicle-body front-side end (hereinafter referred to as "front end") 28A of the power unit 28 (that is, the rear end 30A is placed generally at the same position as a rear end of the outer panel 17).

Hereby, when the outer panel 17 is deformed in a crushed manner (deformed in a compressive manner) and that part of the front side member 12 (the inner panel 14 and the outer panel 16) which is placed between the rear end of the reinforcing member 30 (the outer panel 17) and the engine mount 26 is deformed to be bent inwardly in the vehicle width direction, part of the inner panel 14 to which the reinforcing member 30 is joined surely abuts with a vehicle-width outer end (hereinafter referred to as "outer end") 28B of the power unit 28 in a longitudinal direction of the reinforcing member 30.

Note that the front end 30B of the reinforcing member 30 is placed at the same position as the rear end of the crash box 20. In other words, the front end 30B of the reinforcing member 30 is extended to the same position as that front end (a maximally widened portion) of the front side member 12 which is maximally widened (i.e., to the rear end of the crash box 20).

Figure 5:
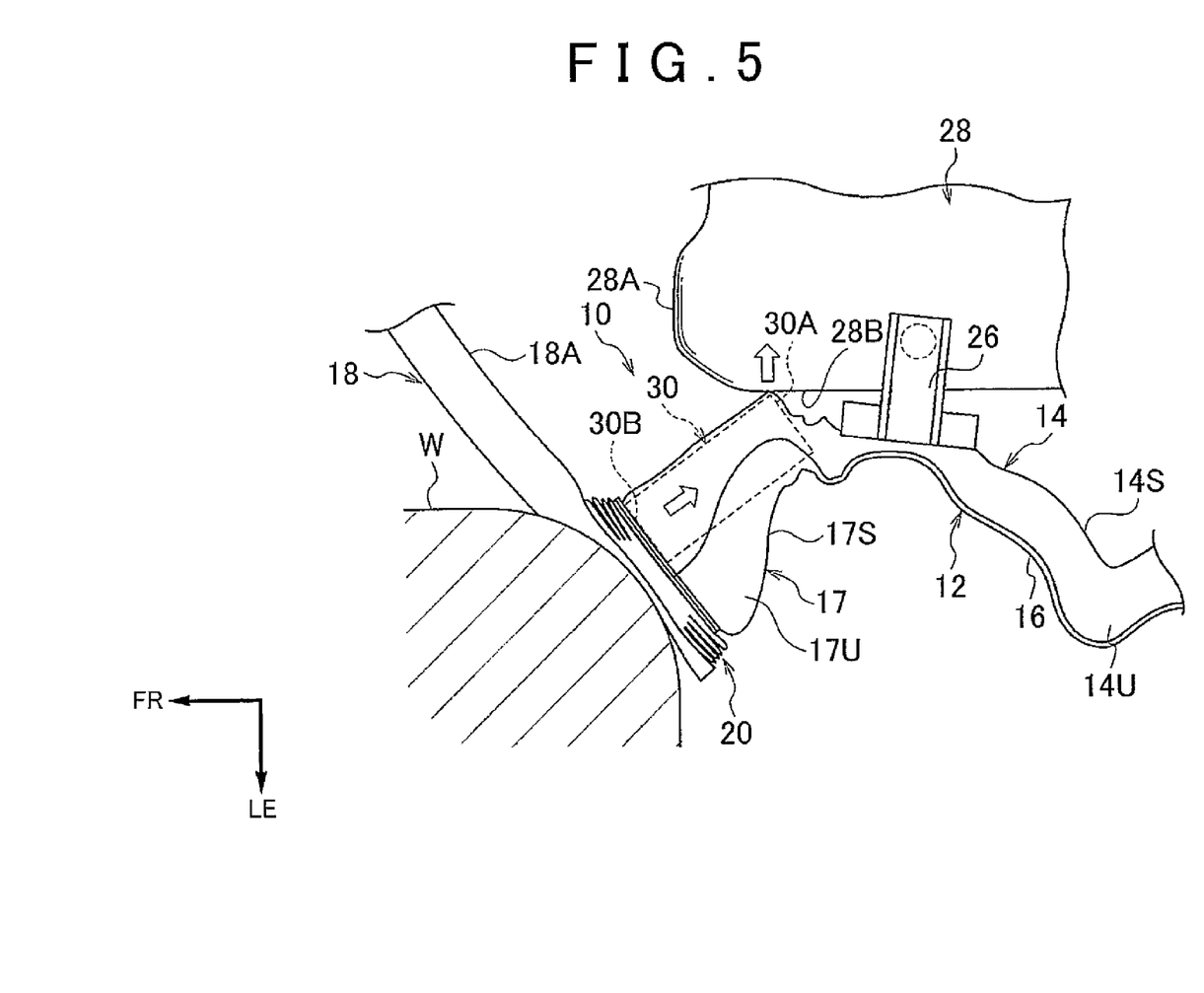
FIG. 5 is a plane view illustrating a state of the vehicle-body front structure according to the first embodiment after the short overlap collision.

That is, as illustrated in FIG. 5, a length of the reinforcing member 30 in the vehicle-body front-rear direction is larger than or at least a shortest distance between the outer end 28B of the power unit 28 and a barrier W in a plane view in a state where the vehicle has a short overlap collision with the barrier W and the front end 28A of the power unit 28 reaches the barrier W in a side view.

Further, the reinforcing member 30 is not limited to one made from metal, and may be made from resin, provided that the reinforcing member 30 has a strength (rigidity) higher than those of the inner panel 14 and the outer panel 17 (the outer panel 16). Further, the reinforcing member 30 may be configured to have a further higher rigidity (strength) by further providing a reinforcing plate or the like (not shown) on a vehicle-width outer side of the side wall 32 of the reinforcing member 30 and between the upper wall 36 and the bottom wall 38.

Further, in a plane view, that part of the inner panel 14 to which the outer panel 17 is joined is formed so as to be wider than that part thereof to which the outer panel 16 is joined (so that lengths of the upper wall 14U and the bottom wall 14D in the vehicle-width direction become large). The reinforcing member 30 is provided in that part (a front side) of the inner panel 14 which is opposed to the outer panel 17 in the vehicle width direction.

That is, that part of the front side member 12 which is placed on the vehicle-body front side relative to the rear end 30A (the rear wall 44) of the reinforcing member 30 has a strength higher than that part of the front side member 12 which is placed on the vehicle-body front side relative to the engine mount 26 and on the vehicle-body rear side relative to the rear end 30A (the rear wall 44) of the reinforcing member 30. Hereby, that part of the front side member 12 which is placed on the vehicle-body front side relative to the engine mount 26 and on the vehicle-body rear side relative to the rear end 30A (the rear wall 44) of the reinforcing member 30 is easily deformed to be bent inwardly in the vehicle width direction at the time of a short overlap collision of the vehicle.

The following describes interactions of the vehicle-body front structure 10 thus configured according to the first embodiment.

Figure 4:
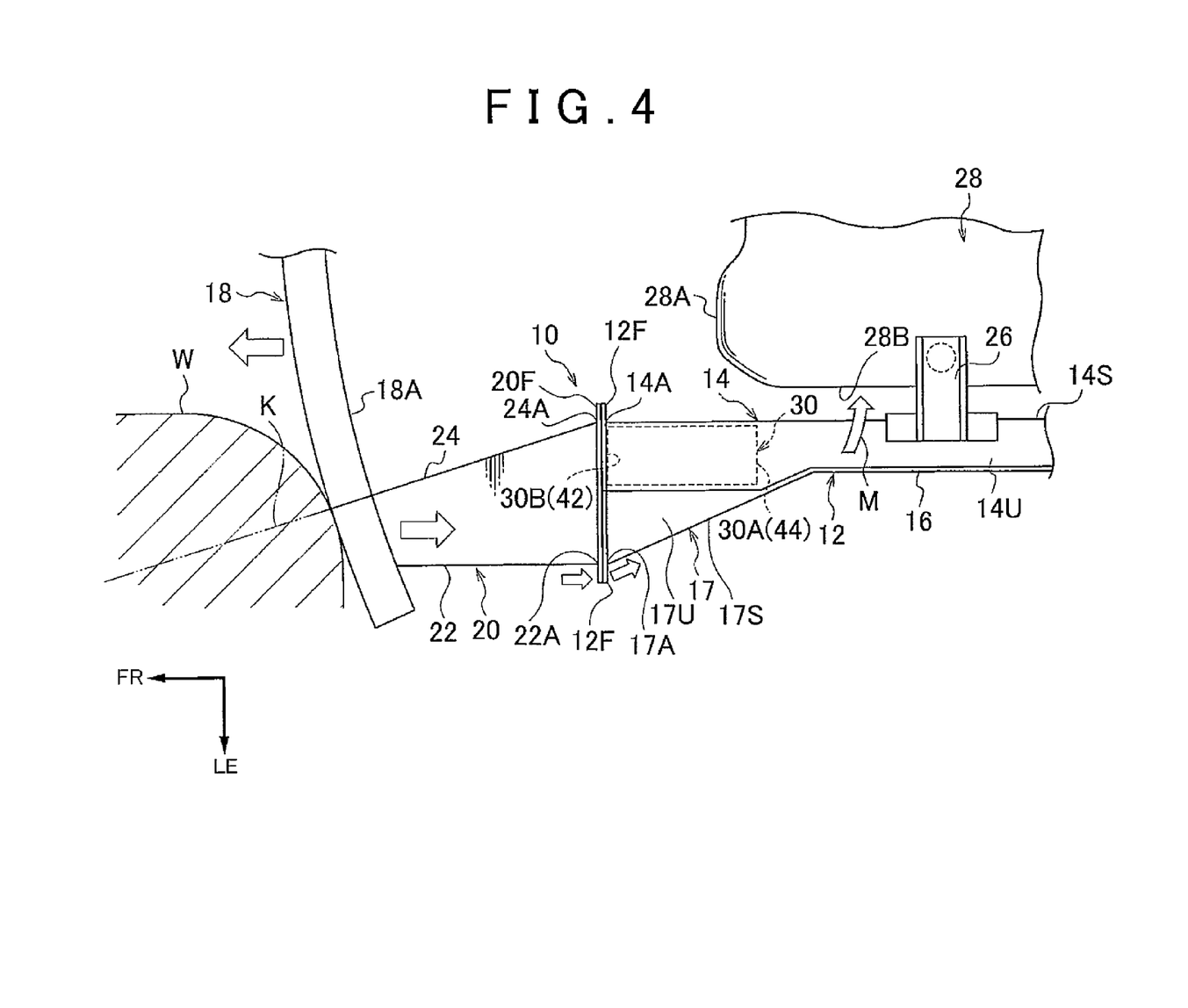
FIG. 4 is a plane view illustrating a state of the vehicle-body front structure according to the first embodiment right before a short overlap collision.

Note that, as illustrated in FIG. 4, the following deals with an example of a short overlap collision in which a barrier W collides with that left end of the front bumper reinforcement 18 which is placed in a vehicle-width outer end relative to that virtual extended line K extended toward the vehicle-body front side from the front side member 12 (the inner wall 24 of the crash box 20) on the left side of the vehicle.

As illustrated in FIGS. 4, 5, in the short overlap collision, the crash box 20 is deformed in a compressive manner in its axial direction along with a forward movement of the vehicle, so as to absorb part of a collision load. A load (part of the collision load) that is not absorbed by the crash box 20 is input from the rear end 22A of the outer wall 22 of the crash box 20 into the front end 17A of the outer wall 17S of the outer panel 17.

Due to the load (the part of the collision load) thus input, a moment M of a force to cause inward bending in the vehicle width direction with the vehicle-body up-down direction being taken as an axial direction is added to that part of the front side member 12 which is placed on the vehicle-body front side relative to the engine mount 26 and on the vehicle-body rear side relative to the outer panel 17, that is, on the vehicle-body rear side relative to the rear end 30A (the rear wall 44) of the reinforcing member 30.

Here, that part of the front side member 12 which is placed on the vehicle-body front side relative to the rear end 30A (the rear wall 44) of the reinforcing member 30 is configured to have a strength higher than that part of the front side member 12 which is placed on the vehicle-body front side relative to the engine mount 26 and on the vehicle-body rear side relative to the rear end 30A (the rear wall 44) of the reinforcing member 30.

Accordingly, that part of the front side member 12 which is placed on the vehicle-body front side relative to the engine mount 26 and on the vehicle-body rear side relative to the rear end 30A (the rear wall 44) of the reinforcing member 30 is more easily deformed to be bent inwardly in the vehicle width direction, than that part of the front side member 12 which is placed on the vehicle-body front side relative to the rear end 30A (the rear wall 44) of the reinforcing member 30.

Further, the reinforcing member 30 is placed so that the rear end 30A (the rear wall 44) is placed on the vehicle-body front side relative to the engine mount 26 and on the vehicle-body rear side relative to the front end 28A of the power unit 28 in a plane view. Moreover, the length of the reinforcing member 30 is larger than or at least the shortest distance between the outer end 28B of the power unit 28 and the barrier W in a plane view in a state where the front end 28A of the power unit 28 reaches the barrier W in a side view.

Accordingly, when that part of the front side member 12 which is placed on the vehicle-body front side relative to the engine mount 26 and on the vehicle-body rear side relative to the rear end 30A (the rear wall 44) of the reinforcing member 30 is deformed to be bent inwardly in the vehicle width direction (including a case where the outer panels 16, 17 are deformed in a compressive manner), that part (part that remains uncrushed) of the inner panel 14 to which the reinforcing member 30 is joined intervenes between the barrier W and the power unit 28 (the outer end 28B) at an early stage, as illustrated in FIG. 5.

That is, at an early timing just after the short overlap collision, the reinforcing member 30 that is hard to be deformed in a compressive manner is sandwiched between the barrier W and the power unit 28 (the outer end 28B) (that is, a force is added to the reinforcing member 30 in a compression direction), and a load (part of a collision load) input due to the collision with the barrier W is efficiently transmitted to the power unit 28 along a longitudinal direction of the reinforcing member 30.

Accordingly, at the time of the short overlap collision of the vehicle, it is possible to efficiently generate a lateral force (a force directed to an opposite side to a collision side in the vehicle width direction) with respect to the vehicle at an early stage, thereby making it possible to slow down (stop) the vehicle at an early stage (at least in the first half of the collision). That is, at the time of the short overlap collision of the vehicle, it is possible to move a passenger compartment (an occupant space) away from the barrier W at an early stage, thereby making it possible to prevent or restrain the passenger compartment (the occupant space) from being deformed.

Figure 6:
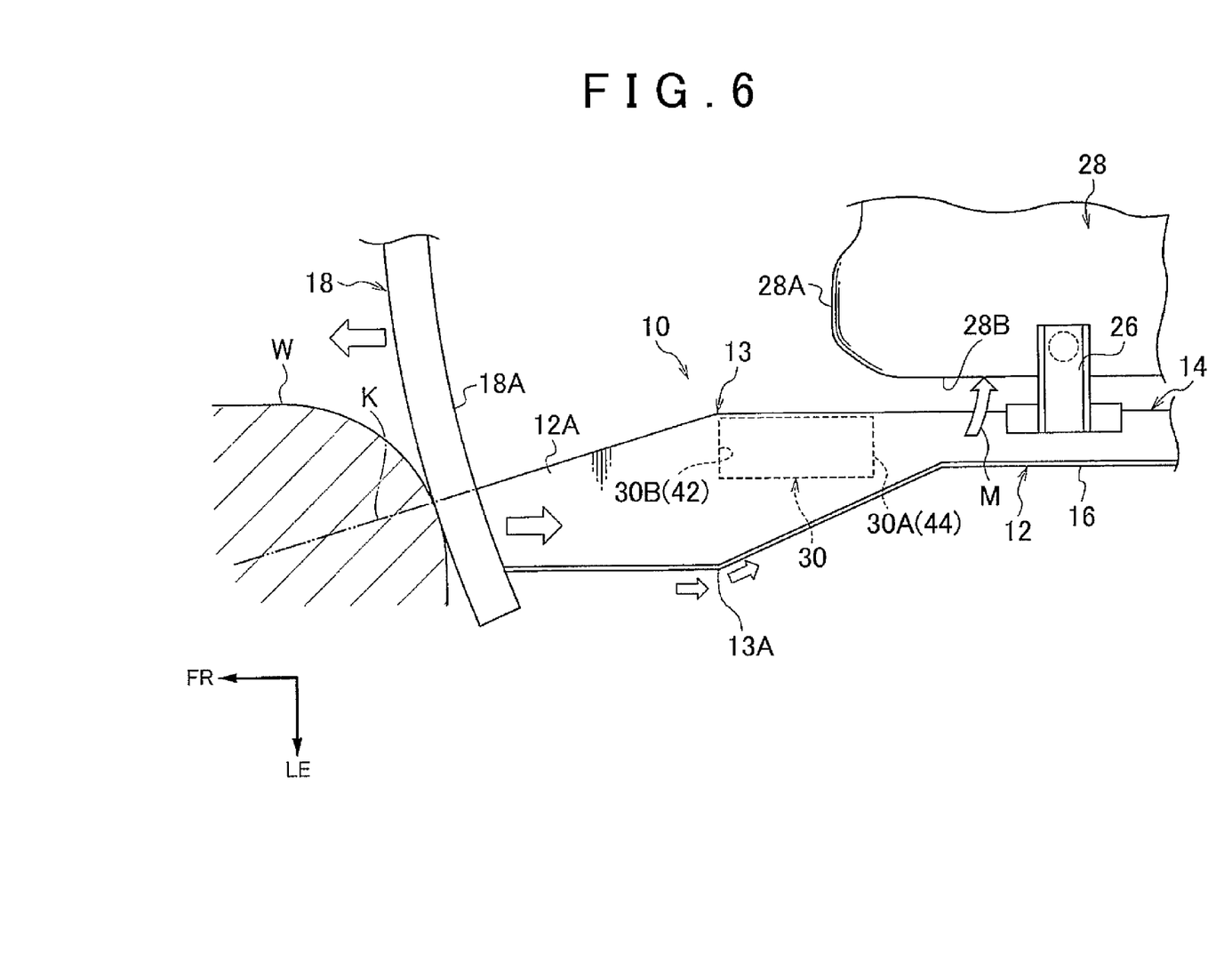
FIG. 6 is a plane view illustrating a state of a vehicle-body front structure according to a second embodiment right before a short overlap collision.
Figure 7:
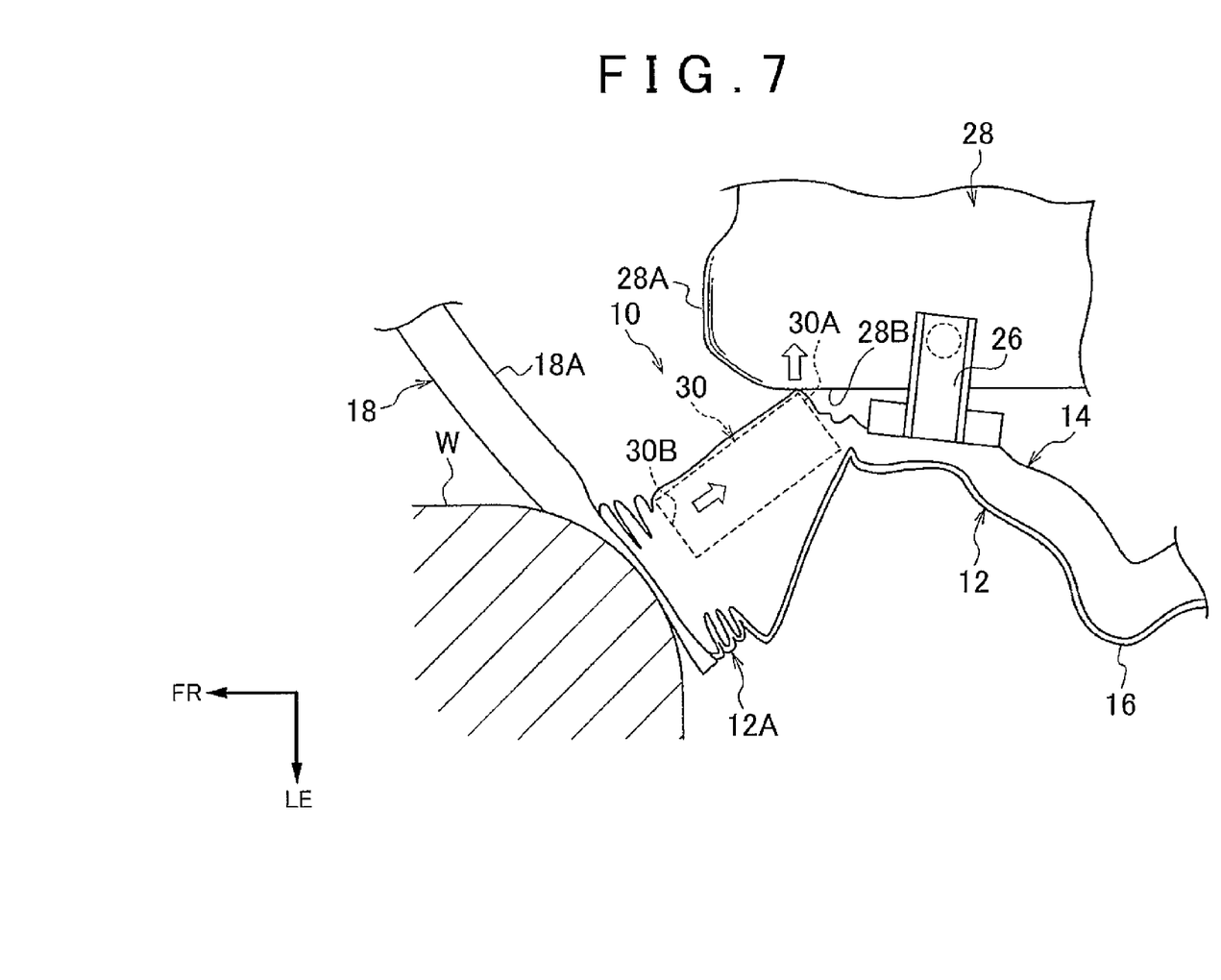
FIG. 7 is a plane view illustrating a state of the vehicle-body front structure according to the second embodiment after the short overlap collision.

<Second Embodiment> Next will be described a vehicle-body front structure 10 according to a second embodiment. Note that a portion equivalent to a portion in the first embodiment has the same reference sign as the portion in the first embodiment, and detailed descriptions thereof (including common interactions) are omitted appropriately.

As illustrated in FIG. 6, a vehicle-body front structure 10 according to the second embodiment is not provided with a crash box 20, and a front side member 12 is extended longer than that of the first embodiment toward a vehicle-body front side. More specifically, the front side member 12 is configured to have a rectangular closed section such that open ends of an inner panel 14 having a "U" shaped section are superimposed on open ends of an outer panel 16 having a "U" shaped section so as to be joined (welded) thereto.

A maximally widened portion 13 having a shape similar to the front end of the front side member 12 (the inner panel 14 and the outer panel 17) in the first embodiment is formed in a generally central part of the front side member 12 (the inner panel 14) between a front bumper reinforcement 18 and an engine mount 26.

That is, similarly to the first embodiment, the front side member 12 is formed in a shape which is increased in width from around a rear end 30A (a rear wall 44) of a reinforcing member 30 as the front side member 12 goes toward the vehicle-body front side and which is tapered from a front end 30B (a front wall 42) of the reinforcing member 30 as the front side member 12 goes toward the vehicle-body front side.

Note that the reinforcing member 30 is provided on an inner-wall-14S side of the inner panel 14 in the closed section of the front side member 12 in a state where the front end 30B (the front wall 42) is placed in the maximally widened portion 13 in a plane view (a side wall 32 is joined to an inner wall 14S, an upper wall 36 is joined to an upper wall 14U, and a bottom wall 38 is joined to a bottom wall 14D).

That is, the reinforcing member 30 is placed so that the front end 30B (the front wall 42) is distanced from a vehicle-width outer end 13A of the maximally widened portion 13 toward a vehicle-width inner side in a plane view (the reinforcing member 30 is placed in an offset manner toward the vehicle-width inner side so that a gap is formed between the reinforcing member 30 and the outer panel 16 in a plane view). Further, the reinforcing member 30 is placed so that the rear end 30A (the rear wall 44) is placed on the vehicle-body front side relative to the engine mount 26 and on the vehicle-body rear side relative to a front end 28A of a power unit 28.

In the vehicle-body front structure 10 according to the second embodiment, that front part 12A of the front side member 12 which has a tapered shape and is placed on the vehicle-body front side relative to the front end 30B of the reinforcing member 30 serves as an energy absorption portion. That is, when a collision load is input into the front part 12A of the front side member 12, a compressive deformation (energy absorption) of the front part 12A is not disturbed by the reinforcing member 30 (a disturbance of the compressive deformation is restrained or prevented).

Even in the vehicle-body front structure 10 thus configured according to the second embodiment, it is possible to obtain an effect similar to the first embodiment. That is, as illustrated in FIG. 6, when a barrier W collides with that left end of the front bumper reinforcement 18 which is placed in a vehicle-width outer end relative to that virtual extended line K extended toward the vehicle-body front side from the front side member 12 on the left side of the vehicle, part of a collision load is input into the vehicle-width outer end 13A of the maximally widened portion 13.

More specifically, along with a forward movement of the vehicle after the short overlap collision, that front part 12A (the energy absorption portion) of the front side member 12 which is placed on the vehicle-body front side relative to the maximally widened portion 13 (the front end 30B of the reinforcing member 30) is deformed in a compressive manner in its axial direction so as to absorb a collision load, and further, a moment M of a force to cause inward bending in the vehicle width direction with the vehicle-body up-down direction being taken as an axial direction is added to that part of the front side member 12 which is placed on the vehicle-body front side relative to the engine mount 26 and on the vehicle-body rear side relative to the rear end 30A (the rear wall 44) of the reinforcing member 30.

Accordingly, as illustrated in FIG. 7, that part of the front side member 12 which is placed on the vehicle-body front side relative to the engine mount 26 and on the vehicle-body rear side relative to the rear end 30A (the rear wall 44) of the reinforcing member 30 is easily deformable to be bent inwardly in the vehicle width direction (including a case where the outer panel 16 is deformed in a compressive manner), and that part (part that remains uncrushed) of the inner panel 14 to which the reinforcing member 30 is joined intervenes between the barrier W and the power unit 28 (the outer end 28B) at an early stage.

That is, at an early timing just after the short overlap collision, the reinforcing member 30 that is hard to be deformed in a compressive manner is sandwiched between the barrier W and the power unit 28 (the outer end 28B) (that is, a force is added to the reinforcing member 30 in a compression direction), and a load (part of a collision load) input due to the collision with the barrier W is efficiently transmitted to the power unit 28 along a longitudinal direction of the reinforcing member 30.

Accordingly, at the time of a short overlap collision of the vehicle, it is possible to efficiently generate a lateral force (a force directed to an opposite side to a collision side in the vehicle width direction) with respect to the vehicle at an early stage, thereby making it possible to slow down (stop) the vehicle at an early stage (at least in the first half of the collision). That is, at the time of the short overlap collision of the vehicle, it is possible to move a passenger compartment (an occupant space) away from the barrier W at an early stage, thereby making it possible to prevent or restrain the passenger compartment (the occupant space) from being deformed.

The vehicle-body front structure 10 according to the present embodiment has been described with reference to the drawings. However, the vehicle-body front structure 10 according to the present embodiment is not limited to those illustrated herein, and its design is modifiable appropriately within a range that does not deviate from the gist of the present invention. For example, the recessed groove 34 may not be formed on the side wall 32 of the reinforcing member 30, or two or more recessed grooves 34 may be formed thereon. Further, the reinforcing member 30 may be provided not on the inner side of the inner panel 14, but on an outer side of the inner panel 14.

That is, the reinforcing member 30 may have a strength (rigidity) and a shape that allow the reinforcing member 30 to transmit, to the power unit 28, a collision load input into the front side member 12. Further, the reinforcing member 30 may not be joined to respective inner surfaces of the inner wall 14S, the upper wall 14U, and the bottom wall 14D of the inner panel 14. Further, the above description deals with an example in which the vehicle-body front structure 10 according to the present embodiment is configured in a symmetric manner, but the vehicle-body front structure 10 may not be configured in a symmetric manner.

What is claimed is:

1. A vehicle-body front structure comprising:
    a front side member which has a closed section by joining an inner panel placed on a vehicle-width inner side to an outer panel placed on a vehicle-width outer side, the front side member being placed in a vehicle-body front portion along a vehicle-body front-rear direction and being provided with an energy absorption portion that is provided on a vehicle-body front side of the front side member; and
    a reinforcing member provided on an inner-panel side in an offset manner toward the vehicle-width inner side from a vehicle-width outer end of a rear end of the energy absorption portion in a plane view,
    wherein:
    a rear end of the reinforcing member is placed on the vehicle-body front side relative to a support portion and on a vehicle-body rear side relative to a vehicle-body front-side end of a power unit in a plane view; and
    a rear end of the energy absorption portion is placed at a same position as a front end of the reinforcing member in a plane view; and
    the support portion is provided on the inner panel of the front side member which supports the power unit placed on the vehicle-width inner side of the front side member in a plane view.

2. The vehicle-body front structure according to claim 1, wherein:
    a part of the front side member which is placed on the vehicle-body front side relative to the rear end of the reinforcing member has a strength higher than a part of the front side member which is placed on a vehicle-body rear side relative to the rear end of the reinforcing member.

3. The vehicle-body front structure according to claim 1, wherein:
    a length of the front side member in a vehicle width direction is increased in a plane view as the front side member goes toward the vehicle-body front side from the rear end of the reinforcing member.

4. The vehicle-body front structure according to claim 3, wherein:
    a vehicle-width outer end of the rear end of the energy absorption portion is placed at the same position as a vehicle-width outer end of a front end of the outer panel in a plane view.

5. The vehicle-body front structure according to claim 1, wherein:
    the inner panel is formed to have a "U" shaped section, and the reinforcing member is placed along an inner surface of the inner panel.

6. The vehicle-body front structure according to claim 5, wherein:
    the reinforcing member is formed with the vehicle-body front-rear direction being taken as a longitudinal direction, and has a rectangular casing shape having an opening on its vehicle-width outer side.

7. The vehicle-body front structure according to claim 6, wherein:
    the reinforcing member includes a side wall having an outer surface joined to an inner surface of an inner wall of the inner panel; and
    a recessed groove serving as a bead portion is formed in a central part of the side wall in a vehicle-body up-down direction so that the recessed groove is recessed outwardly in a vehicle width direction in a rectangular shape and extends in the vehicle-body front-rear direction.

* * * * *